Dec. 15, 1931.  A. SPYER  1,836,198
PIPE JOINT
Filed July 11, 1927
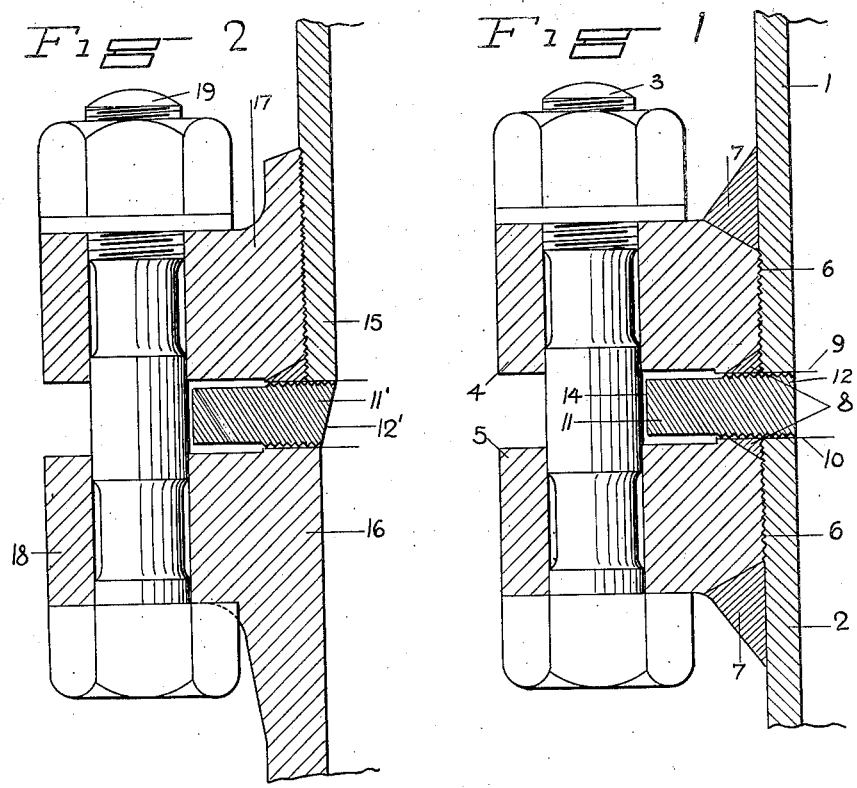
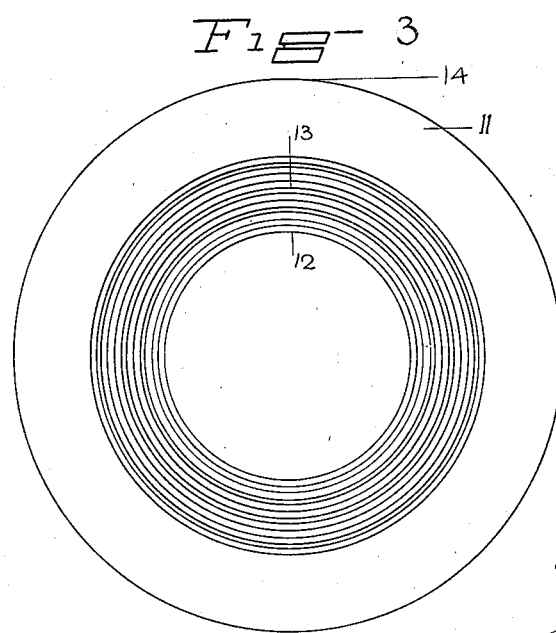
INVENTOR
Arthur Spyer
BY
Gifford & Scull
ATTORNEY Patented Dec. 15, 1931

1,836,198

UNITED STATES PATENT OFFICE

ARTHUR SPYER, OF LONDON, ENGLAND, ASSIGNOR TO THE BABCOCK & WILCOX COMPANY, OF BAYONNE, NEW JERSEY, A CORPORATION OF NEW JERSEY

PIPE JOINT

Application filed July 11, 1927, Serial No. 204,729, and in Great Britain July 15, 1926.

This application relates to a novel and improved means for forming a steam-tight joint and will be best understood from the following description.

In the accompanying drawings, in which I have shown a selected embodiment of my invention, Figure 1 is a section through a portion of a joint showing one form of the invention;

Fig. 2 is a view similar to Fig. 1 but showing a modified form which the invention may take;

Fig. 3 is a plan view of the ring shown in Fig. 1 detached from the joint.

Referring now to the drawings in detail, and more particularly to Fig. 1, there are shown therein two annular members 1 and 2 which may be considered as aligned pipes for a steam conduit, which pipes it is desired to join together. These pipes may be secured by means of a plurality of bolts, one of which is shown at 3, and these bolts may pass through flanges 4 and 5 upon the respective pipes. The flanges may be secured to the pipes in any usual and well-known manner, being formed in one piece with the pipe or made integral therewith by having screw-threaded engagement, as at 6, and being held against rotation by means of the welds indicated at 7 and 8. The bolts 3 are preferably turned down for the portions of their lengths which are received within the flanges.

Disposed between the surfaces 9 and 10 of the members 1 and 2 is a ring 11, which is best shown in Fig. 3. This ring has its inside diameter substantially the same as the inside diameter of the members 1 and 2, whereby a smooth interior surface for the conduit is ensured. The outside diameter of the ring may be made of any desired extent but it is shown herein as being such that the bolts 3 will prevent transverse movement of the ring and thus center it with its inner surface 12 flush with the surfaces of the members 1 and 2.

Disposed on the two faces of the ring 11 and extending outwardly therefrom are projections which are shown herein as a multiplicity of fine annular serrations 13. These serrations may extend for any desired distance along the faces, which may be found necessary in order to maintain a tight joint. The ring is preferably made of mild or soft steel which will result in the projections or serrations being crushed into the surface of the flange to some extent when the bolts 3 are tightened, and also in the serrations being rounded over themselves, resulting in a labyrinth of annular barriers across the faces of the flanges.

Referring now to Fig. 2, I have shown therein two tubular members 15 and 16 of different diameters. By the word "fine" I mean that the serrations are small as compared with the thickness of the ring 11. By this arrangement, the ring will be preserved against distortion when the bolts are tightened, while, at the same time, the serrations or projections may be crushed in the manner described above. The metal of the ring, and more particularly of the serrations, being soft, will not bite into the faces of the adjacent pipes with which the serrations come in contact. This means that a ring may be taken out and replaced where a tight joint may be formed, which would not be the case if the serrations were of hard material which would bite into the pipe ends. These members are provided with flanges 17 and 18 through which pass a plurality of bolts 19, and the joint is completed by means of a ring 11' having the inclined inner surface 12' which is so designed as to connect the inner surfaces of the members 15 and 16. Otherwise this ring corresponds in all details to the ring 11.

In both forms of the invention the contact between the surfaces of the members, which are to be joined together, and the multiplicity of fine annular serrations, which are pressed into intimate contact with the surfaces, will result in a tight joint, because of the fact that steam would have to force its way past what are in effect a multiplicity of successive joints formed by the serrations contacting with the surfaces 9 and 10 before it could escape. These separate joints are made still tighter by the fact that the ring is made of relatively soft metal so that the inequalities in the surfaces 9 and 10 are compensated for by the flattening out of the serrations and a flattening out of a serration makes a wider joint at that particular serration.

I am aware that various changes in details will suggest themselves to those skilled in the art and therefore I do not intend to limit myself except by the appended claim.

I claim:

In combination, two annular members having flanged ends adjacent and substantially parallel to each other, a ring disposed between said ends and having two substantially parallel opposite faces, with each face contacting with the flanged end of one of said members, said ring being relatively thick and having a large number of annular serrations on said faces where they contact with said ends, said serrations being fine compared to the thickness of the ring and closely spaced and formed of softer metal than the metal of the members, and means for drawing said flanged ends toward each other, whereby said serrations will be spread out to form a large number of tight joints between the ring and the adjacent ends of said members without deforming the body of the ring.

ARTHUR SPYER.